United States Patent
Mitlin

(10) Patent No.: US 7,110,479 B2
(45) Date of Patent: Sep. 19, 2006

(54) METHOD FOR DETERMINING THE QUALITY OF A COMMUNICATION CHANNEL

(75) Inventor: Vlad Mitlin, 10329 Azuaga St. 263, San Diego, CA (US) 92129

(73) Assignee: Vlad Mitlin, San Diego, CA (US)

( * ) Notice: Subject to any disclaimer, the term of this patent is extended or adjusted under 35 U.S.C. 154(b) by 0 days.

(21) Appl. No.: 10/792,740

(22) Filed: Mar. 5, 2004

(65) Prior Publication Data
US 2005/0197069 A1    Sep. 8, 2005

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)

(52) U.S. Cl. ............... 375/346; 375/285; 327/310; 327/384; 327/551; 455/296

(58) Field of Classification Search ............ 375/346
See application file for complete search history.

(56) References Cited

U.S. PATENT DOCUMENTS

| | | | |
|---|---|---|---|
| 5,581,580 A | 12/1996 | Lindbom et al. | |
| 5,666,429 A | 9/1997 | Urbanski | |
| 6,205,410 B1 | 3/2001 | Cai | |
| 6,298,242 B1 | 10/2001 | Schiff | |
| 6,442,495 B1 | 8/2002 | Fleming-Dahl | |
| 547,174 A1 | 2/2004 | Mitlin | |

OTHER PUBLICATIONS

P.J.Chang, A.Rofougaran, A.A.ABIDI: "A CMOS Channel-Select Filter for a Direct-Conversion Wireless Receiver" This paper was presented at the Symposium on VLSI Circuits, Honolulu, Jun. 13-15, 1996; pp. 62-63.

*Primary Examiner*—Chieh M. Fan
*Assistant Examiner*—Erin M. File

(57) ABSTRACT

In accordance with the present invention, there are provided methods for estimating the level of interferers and the level of a useful signal in a spectral window of a given bandwidth in a communications channel in a complex multipath propagation environment. The first method of estimating the level of interferers comprises generating and transmitting several sets of sine waves on the Nyquist frequency. Each set is characterized by a certain phase so that the sequence of phase values evenly spans the interval $(0, 2\pi)$ radians. The second method comprises generating and transmitting several sets of sine waves of the same phase, with frequencies evenly spanning a vicinity of the Nyquist frequency. The method of estimating the level of a useful signal comprises transmitting several repetitions of the signal used for actual data transmission and processing it by the receiving station.

5 Claims, 22 Drawing Sheets

0: Sine wave generator
1: Multipath channel token
2: AWGN token
3: Adder
4: Data collection module (estimated noise level)
5: Multiplier
6: Averager
7: Data collection module (actual noise level)
8: Multiplier
9: Averager 0: Sine wave generator
1: Multipath channel token
2: AWGN token
3: Adder
4: Data collection module
   (estimated noise level)
5: Multiplier
6: Averager
7: Data collection module
   (actual noise level)
8: Multiplier
9: Averager 10: Waveform (PSN/FSN) generator
11: Multipath channel token
12: AWGN token
13: Adder
14: Data collection module
15: Lowpass filter
16: Multiplier
17: Window averager
18: Sampler 19: Waveform (PSN/FSN) generator
20: Multipath channel token
21: AWGN token
22: Adder
23: Lowpass filter
24: Window averager
25: Unit delay
26: Noise level estimator (Eq. 2)
27: Unit delay
28: Data collection module
29: Sampler

FIGURE 11.

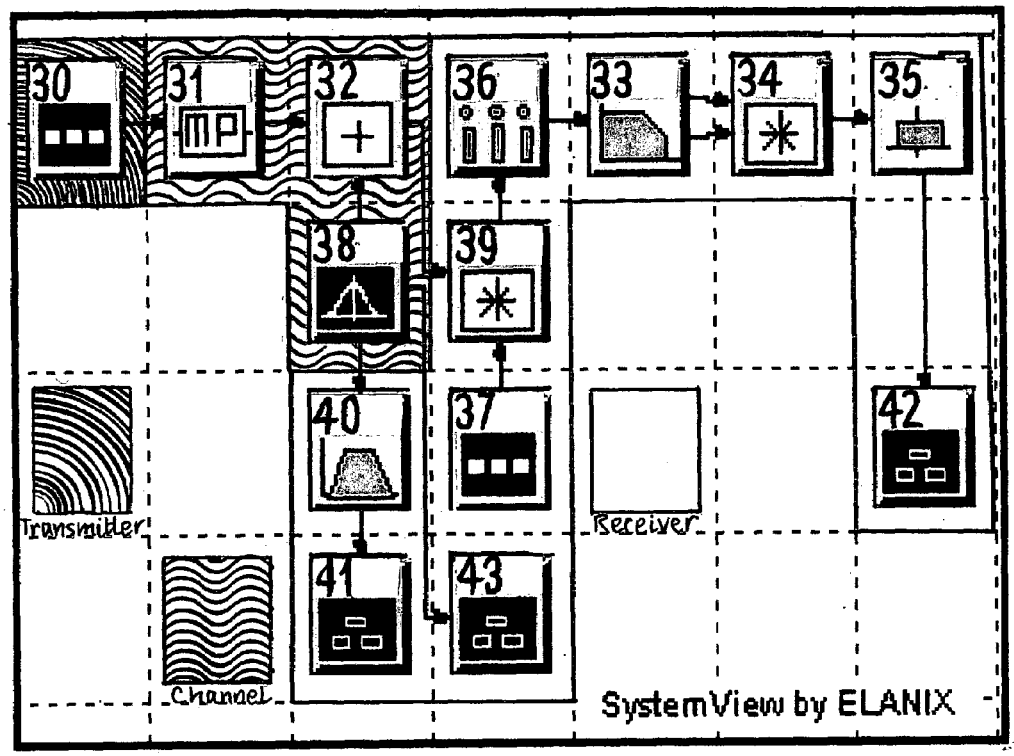

30: Waveform (PSN/FSN) generator and upconverter module
31: Multipath channel token
32: Adder
33: Lowpass filter
34: Multiplier
35: Window averager
36: Sampler
37: Downconverter module (Eq. 6)
38: AWGN token
39: Multiplier
40: Bandpass filter for collecting noise energy in a spectral window
41: Data collection module (actual noise level in the spectral window)
43: Data collection module (actual noise level in the whole bandwidth)
42: Data collection module (estimated noise level in the spectral window)

44: Generator of a useful signal      55: Averager
45: Multipath channel token
46: AWGN token
47: Adder
48: Data collection module (estimated level of useful signal plus noise)
49: Lowpass filter
50: Sampler
51: Data collection module (actual level of useful signal)
52: Data collection module (actual noise level)
53: Data collection module (actual level of useful signal plus noise)
54: Multiplier

METHOD FOR DETERMINING THE QUALITY OF A COMMUNICATION CHANNEL

FIELD OF THE INVENTION

The present invention relates to determining the quality of a communications channel and, more particularly, to reliably estimating signal-to-noise ratio of the channel in a complex multipath propagation environment.

BACKGROUND OF THE INVENTION

It is recognized in digital communications that a precise knowledge of the parameters characterizing the quality of a communications channel is extremely important for efficient data transmission. This is related to the classical Shannon result stating that the data rate of a communications channel is a function of the signal-to-noise ratio (SNR). For a given signal, the increase in the noise level affects the quality of transmission adversely. The amount of information that can be reliably transmitted over a communications channel decreases as the noise increases.

The precise knowledge of the SNR of a channel dictates how much information will be ultimately transmitted. If one underestimates the SNR, the channel efficiency drops compared to the most efficient transmission mode. If one overestimates the SNR then more data is transmitted but the information is unreliable. Therefore, it is extremely important to be able to estimate the SNR of a communications channel in a precise and timely manner.

This is even more important in modern wireless communications that meet new challenges with respect to increasingly complex propagation environments. Typical examples of such environments would be urban areas, office buildings, military vessels, war zones, jungles, rock concerts etc. Some of these environments are characterized by severe multipath effects, others by strong fading, and others by both. When a communication session between two stations is initiated in such an environment, the SNR should be measured on both ends of the channel as precisely as possible and further communications over this channel are stipulated by the SNR value measured.

The present application is related to U.S. Patent Disclosure No. 547174, titled "Method and Apparatus for Determining the Quality of a Communications Channel in Complex Propagation Environments", invented by Vlad Mitlin, filed on Feb. 18, 2004, and owned by the same assignee now and at the time of the invention.

SUMMARY OF THE INVENTION

In accordance with the present invention, there are provided methods for estimating the level of interferers and the level of a useful signal in a spectral window of a given bandwidth in a communications channel in a complex multipath propagation environment. The first method of estimating the level of interferers comprises generating and transmitting several sets of sine waves on the Nyquist frequency. Each set is characterized by a certain phase so that the sequence of phase values evenly spans the interval $(0, 2\pi)$ radians. The second method of estimating the level of interferers comprises generating and transmitting several sets of sine waves of the same phase, with frequencies evenly spanning a vicinity of the Nyquist frequency. There is an agreement established between the transmitting and receiving stations determining the duration of time intervals between successive sine wave sets. This duration should not be smaller than the maximum delay in the channel determined from a separate test. The method of estimating the level of a useful signal comprises transmitting several repetitions of the signal used for actual data transmission and processing it by the receiving station.

BRIEF DESCRIPTION OF THE DRAWINGS

A complete understanding of the present invention may be obtained by reference to the accompanying drawings, when considered in conjunction with the subsequent, detailed description, in which:

FIG. 11 is a complete system for estimating the level of interferers;

For purposes of clarity and brevity, like elements and components will bear the same designations and numbering throughout the FIGURES.

DESCRIPTION OF THE PREFERRED EMBODIMENT

This invention introduces a new method of determining the level of interferers in a spectral window of a given bandwidth in a communications channel established between the transmitting and receiving stations. Below, this method is illustrated by a set of simulations of increasing complexity.

Main Idea Illustrated

The main idea of the method of determining the level of interferers in a spectral window of a given bandwidth presented below is to generate a special baseband signal at the transmitting station.

Figure 1:
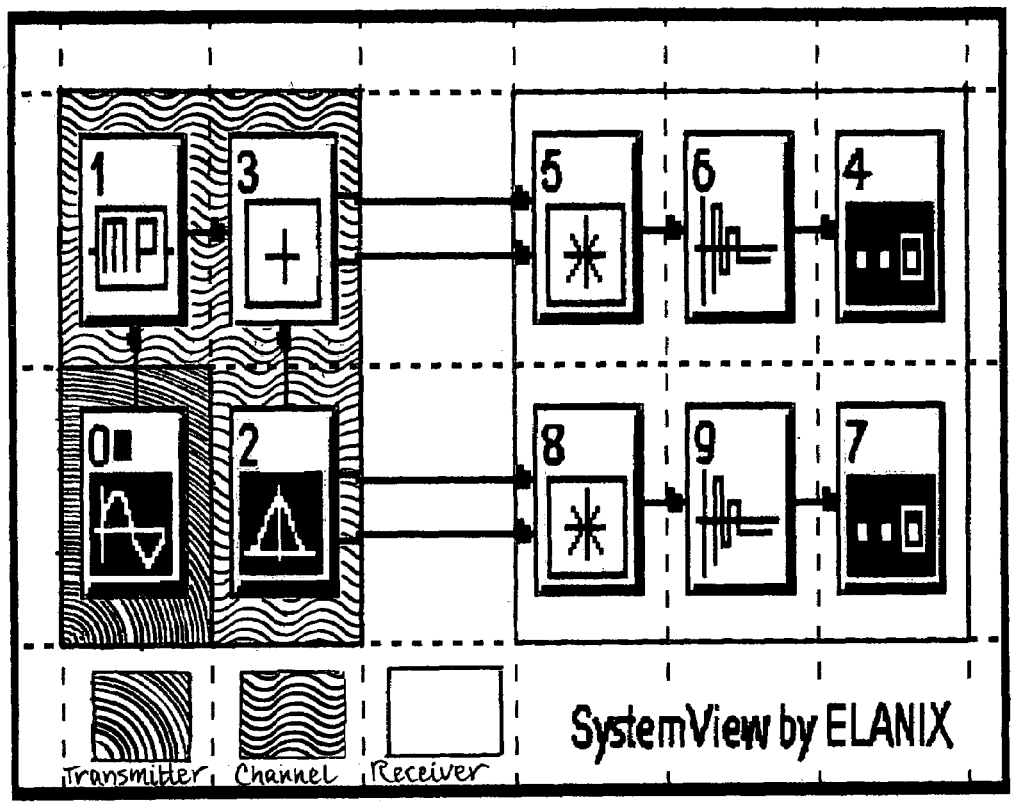
FIG. 1 is an illustrative system for estimating the level of interferers.
Figure 2:
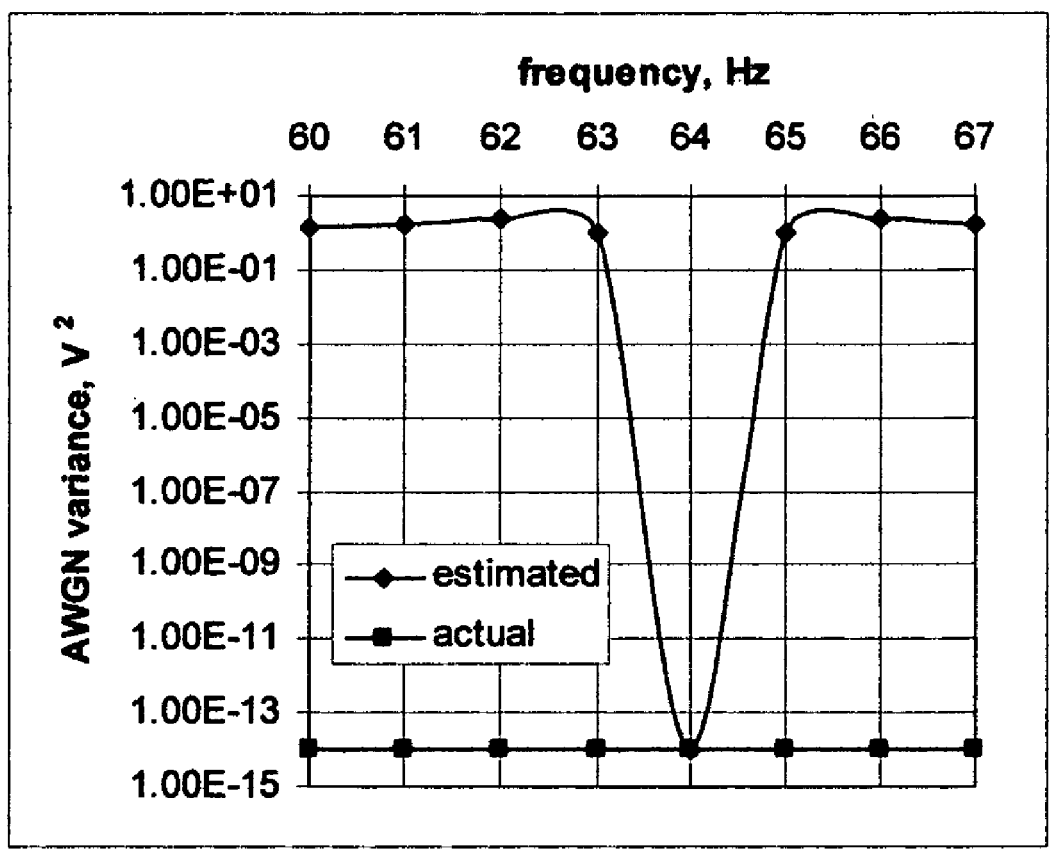
FIG. 2 is a set of actual and estimated noise variances obtained at frequencies of 60, 61, 62, 63, 64, 65, 66, 67 Hz by using the system shown in FIG. 1.
Figure 3:
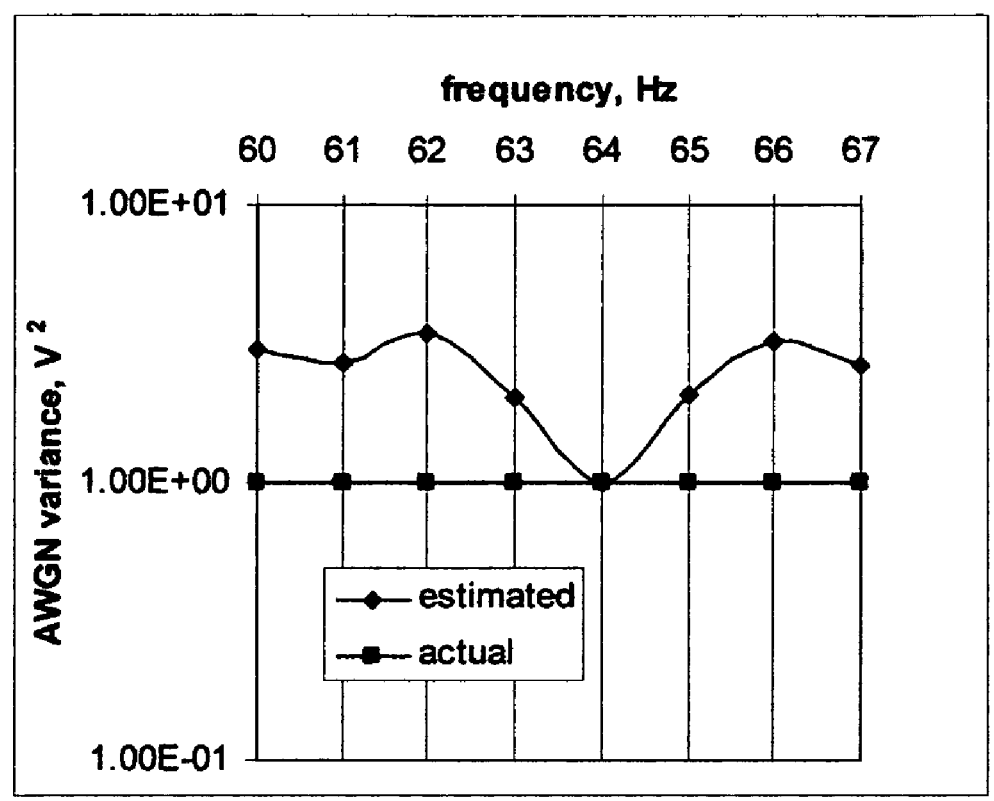
FIG. 3 is a set of actual and estimated noise variances obtained at frequencies of 60, 61, 62, 63, 64, 65, 66, 67 Hz by using the system shown in FIG. 1.

FIG. 1 shows the simplest arrangement. The system for determining the level of interferers comprises a transmitter, a channel, and a receiver. The transmitter is represented by a sine wave generator (token 0). The propagation environment is described by a multipath channel model (token 1) with 10 paths, the maximum delay value of 0.3 seconds, and the value of the K-factor of 1. This severe environment is aggravated by the presence of Gaussian white noise (AWGN, token 2). Depending on the intricacy of the transmitter and receiver the multipath distortion of a signal may or may not be a negative effect. Specifically, if the RAKE receiver is used, the information contained in indirect paths will be utilized and actually will improve the quality of the signal received. If the receiver does not have such capabilities the multipath distortion presents a negative effect. Of course, the presence of AWGN is always a negative factor for transmission. The receiver includes squaring modules (tokens 5 and 8), averagers (tokens 6 and 9), and data collection modules for comparing an actual and an estimated noise levels (tokens 4 and 7). Consider a baseband channel sampled with the frequency of 128 Hz. The test for determining the noise level comprises transmitting several sine wave sequences of increasing frequency and the phase of 0. Seven sequences are transmitted while the sine wave frequency changes by one Hz from 60 Hz to 67 Hz. Notice that our simulation describes spanning the spectrum in the vicinity of the Nyquist frequency which in this particular case is equal to 64 Hz. FIGS. 2 and 3 present the results. FIG. 2 corresponds to the actual AWGN variance of 1e−14 sq. V and FIGS. 3 to 1 sq. V. These figures show both an actual and estimated noise variance versus the sine wave frequency. The value of the AWGN variance at the Nyquist frequency measured at the receiver is exactly equal to the actual value. It is especially stunning how different are the variance values estimated at the Nyquist and non-Nyquist frequencies. For example, in FIG. 2 the difference is about 14 orders.

Phase Spanning Nyquist Set Test

The simulation described above is somewhat idealistic. It assumes that one can perfectly synchronize the transmitter and the receiver, so that there would be no phase shift between the transmitted and the received signal. In reality, such a phase shift is very hard to control. Therefore, the following generalization of the method is proposed. The test comprises transmitting several sine wave sequences on the Nyquist frequency. Each sequence is characterized by a certain phase value. The set of phase values is arranged so that it evenly spans the interval $(0, 2\pi)$ radians. There is an agreement established between the transmitting station and the receiving station determining the duration of time intervals between successive sine wave sequences. This duration should exceed the maximum delay in the channel, determined from a separate test preceding the SNR measurement. For each sequence, one determines an average square of the magnitude of the received signal. The minimum value of this parameter over all data sets yields an estimate of the level of interferers. Determining the level of interferers, as described above, can be attained by means of transmitting a single waveform termed the Phase Spanning Nyquist (PSN) set.

Figure 4:
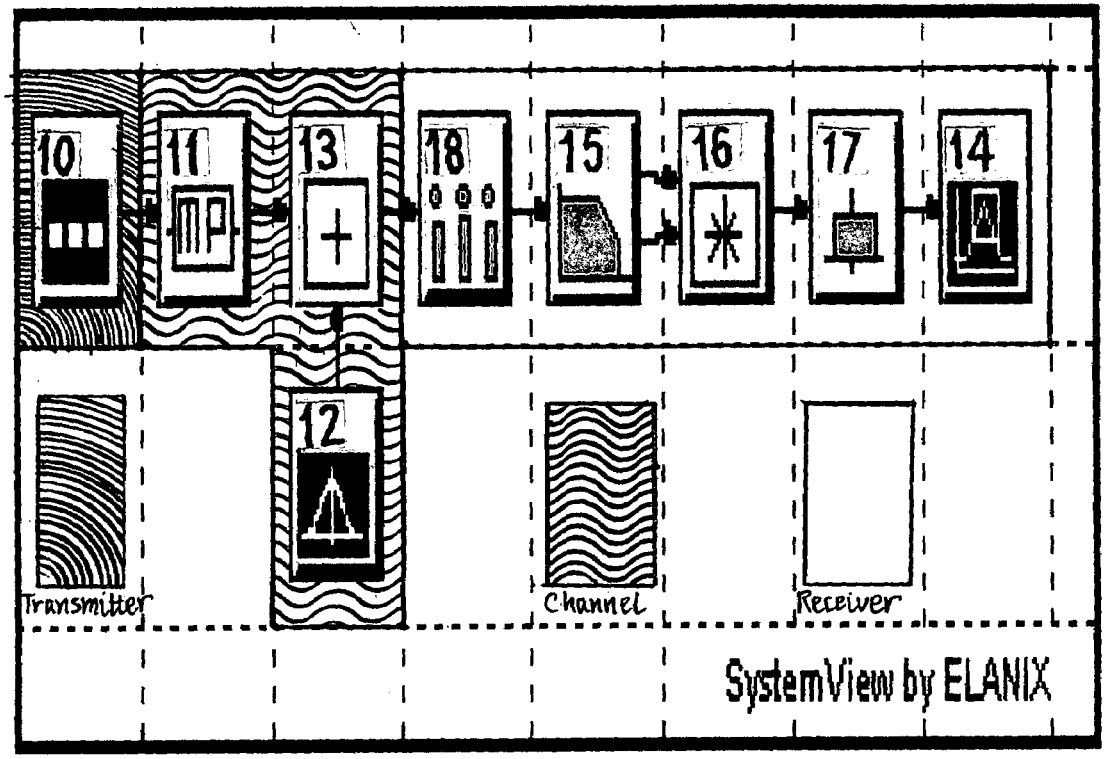
FIG. 4 is a baseband system for estimating the level of interferers.

FIG. 4 shows the next system considered. This is a continuous system for estimation of the level of interferers. Token 10 represents a PSN set generator described by the following equation:

$$s(t)=A \sin(\pi ft+(2\pi n/N)\lfloor ft/n \rfloor) \qquad (1)$$

In this equation s(t) is the waveform transmitted; f is the sampling rate (or, equivalently, the two-sided bandwidth of the spectral window where the SNR is to be determined); N is the total number of samples in the test; n is a parameter for determining the number of samples used in the averager (token 17); A is the signal amplitude chosen from the condition of equality of values of an average transmitted power of a PSN set (i.e. half the A value squared) and of a signal used in actual data transmission; and $\lfloor xj \rfloor$ denotes the maximum integer not exceeding a given real number x.

The channel is represented by a multipath channel token 11 and a AWGN token 12. This signal is transmitted over the channel and is sampled (token 18) and filtered (token 15) at the receiver. Then it is squared (token 16) and averaged (token 17) with a window of $$nD-r$$

seconds, where D=1/f is a spacing between samples; and r is the maximum delay in the channel determined in a separate test. The result goes into a data collection module (token 14) where the minimum of the average variance over the total duration of the waveform is determined. This yields an estimate of the level of interferers.

The parameters for this simulator are as follows: sampling rate 128e+6 Hz; n=256, a channel with 1 path, the maximum delay of 200e−9 seconds, and the K-factor of 1; total number of samples in a PSN set is N=64n, the amplitude of the PSN set is 1 V; the sampling jitter constant equals D/10. The lowpass filter applied at the receiver is the Butterworth filter with 10 poles and a cutoff frequency of 62e+6 Hz.

Figure 5:
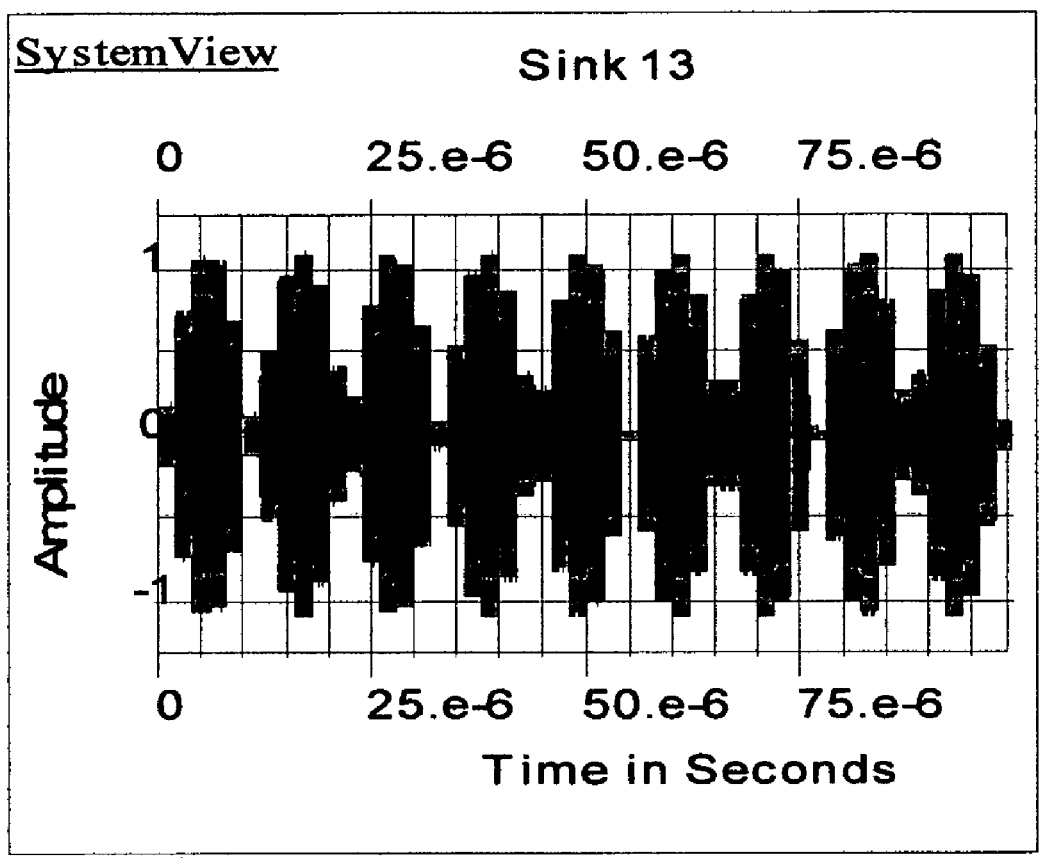
FIG. 5 is an example of a phase spanning Nyquist (PSN) set.

FIG. 5 presents the PSN set transmitted in this test. The PSN set is nearly (but not exactly) periodical with the period of about ⅑ of the test duration.

Figure 6:
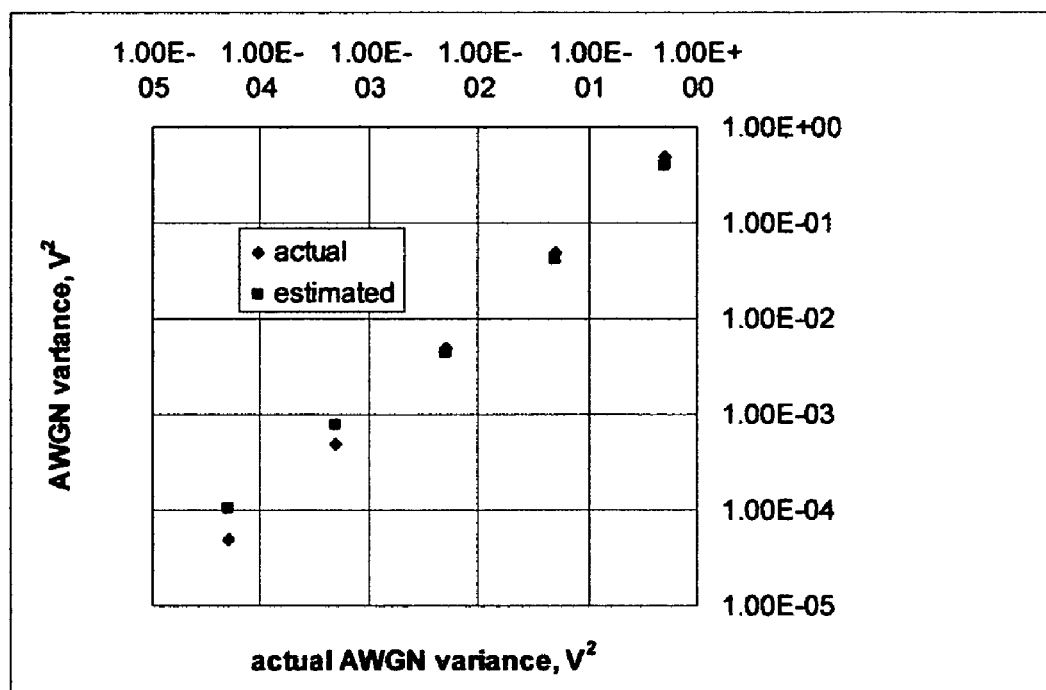
FIG. 6 is an estimated versus the actual level of interferers obtained by using PSN sets in the system shown in FIG. 4.

FIG. 6 presents SNR test results for several different levels of AWGN. The estimated values agree with the actual ones. Note that more precision is lost as the level of noise decreases.

Figure 7:
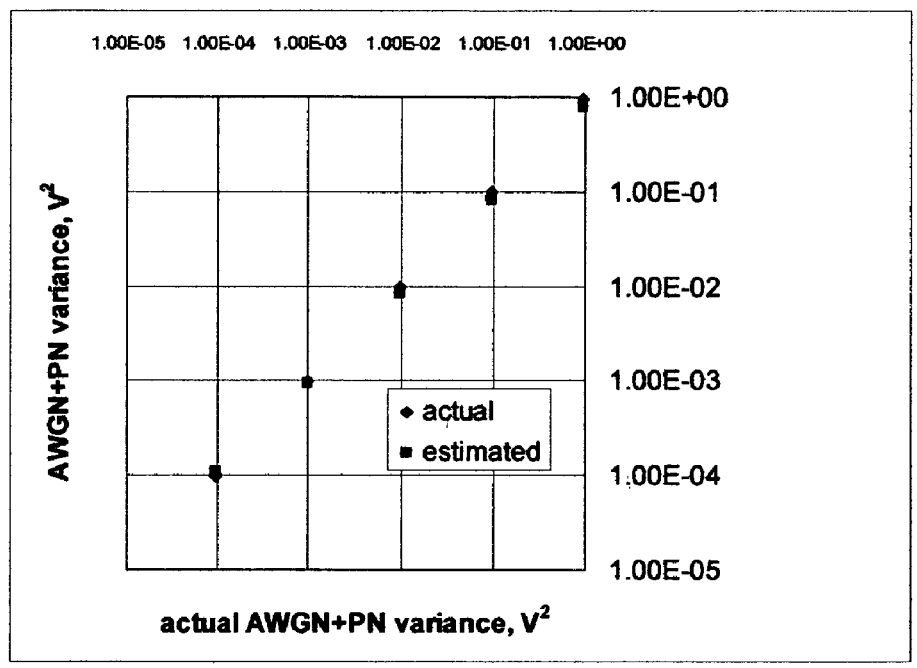
FIG. 7 is an estimated versus the actual level of interferers obtained by using PSN sets in the system shown in FIG. 4.

FIG. 7 presents the results of an SNR test in which two types of interferers affect the channel, e.g. AWGN and PN-sequence with the rate of 12.8e+6 Hz. The magnitude of the PN-sequence is chosen to be equal to the m.s.d. of the AWGN. The estimated and the actual data are in excellent agreement. We did not observe any performance deterioration of the SNR estimator at lower noise levels. This is probably due to the mutual compensation of errors caused by noises from two sources.

Figure 8:
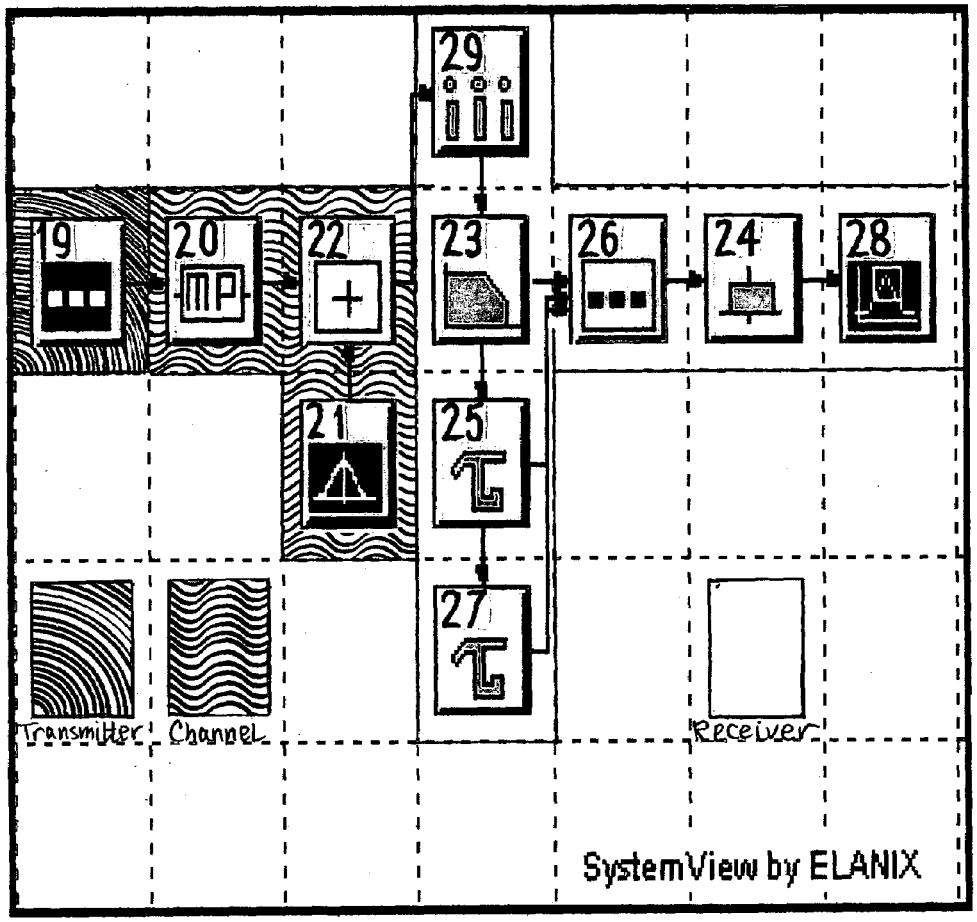
FIG. 8 is a baseband system for estimating the level of interferers.

We are able to achieve an even better performance of an SNR estimator, especially in the range of high SNR. The corresponding system is shown in FIG. 8. The waveform transmitted is a PSN set (token 19). Again, it passes through the multipath channel (token 20) added by AWGN source (token 21). At the receiver the waveform is sampled (token 29), filtered (token 23), and put through a window averager (token 24). The precision of the estimation is improved due to the use of a more sophisticated estimator involving current and delayed samples, instead of just squaring the current signal value. This operation is implemented by tokens 25, 26, and 27 in FIG. 8. The input to the noise level estimator (token 26) is the current signal value and the ones delayed by one and two samples, respectively (tokens 25 and 27). Token 26 performs the following calculation:

$$\text{Output}=s(t)*(s(t)+2*s(t-D)+s(t-2*D)) \quad (2)$$

The estimator using Eqs. (1) and (2) has the precision of about 1 dB in the entire range of noise measurements taken.

It was observed that at high SNR the time dependence of the noise variance usually has a distinctive global minimum. On the contrary, at low SNR this dependence typically has several local minima with values close to that of the global minimum. To determine the global minimum in this case, at low SNR this time series should go through an additional data processing routine. First, this dependence is raised to a power of m: we found that m=32 works well. The next step is integrating the result of this transformation over time. The final step is to divide the result of integration by the total test time and raising the result to a power of 1/m. This data treatment improves the estimation results at low SNR while leaving them nearly unchanged at high SNR.

Frequency Spanning Nyquist Set Test

This section introduces another method of determining the level of interferers with a waveform termed Frequency Spanning Nyquist (FSN) set. The basic idea is not to generate sine waves on a Nyquist frequency while spanning the entire phase range evenly but rather spanning the frequency range in a small vicinity of the Nyquist frequency. Depending on the characteristics of the transmitter, using one of either FSN or PSN set may be preferred.

The system considered below is equivalent to the one shown in FIG. 4 except that token 10 now generates the following waveform:

$$s(t)=A\ \sin(\pi ft(1-b+(2nb/N)\lfloor ft/n \rfloor)) \quad (3)$$

In Eq. (3) s(t) is the waveform transmitted; f is the sampling frequency; N is the total number of samples in an FSN set; b is the parameter used in determining the size of the vicinity of the Nyquist frequency of the spectrum spanned in the test, $$(f(1-b)/2, f(1+b)/2);$$

n defines the window in the averager (token 17) in FIG. 4 as nD-r; and A is the FSN set amplitude determined from the condition of equality of values of an average transmitted power of a FSN set and of a signal used in actual data transmission.

Figure 9:
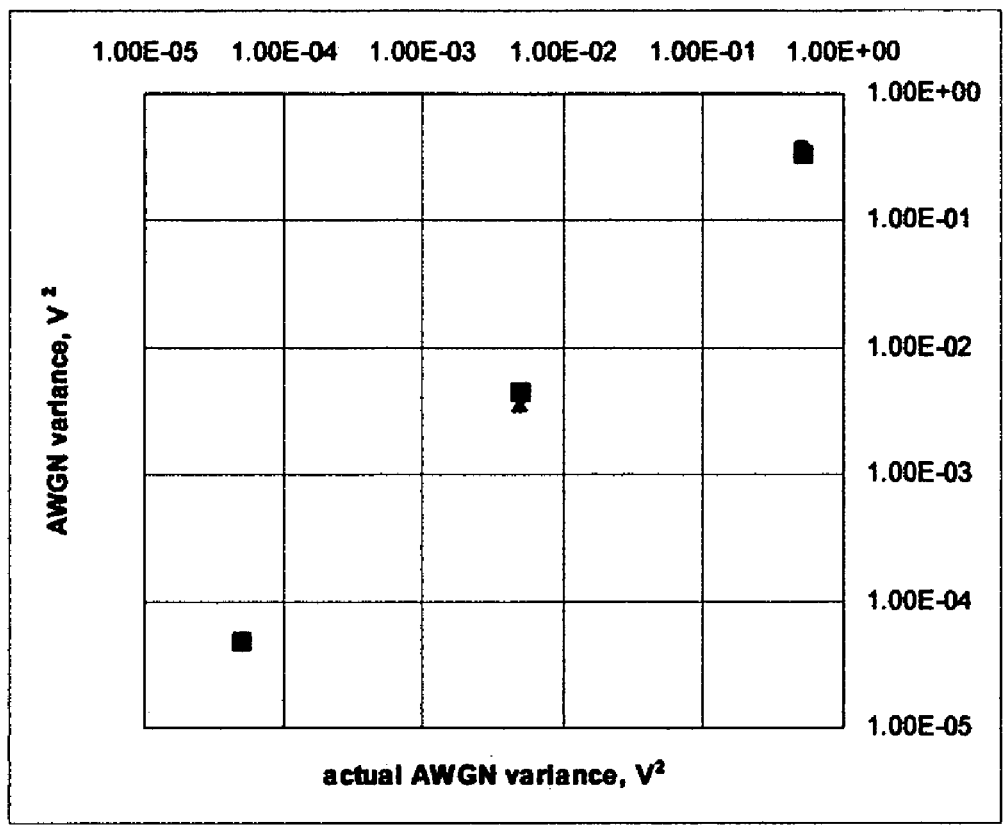
FIG. 9 is an estimated versus the actual level of interferers obtained by using FSN sets in the system shown in FIG. 4.
Figure 10:
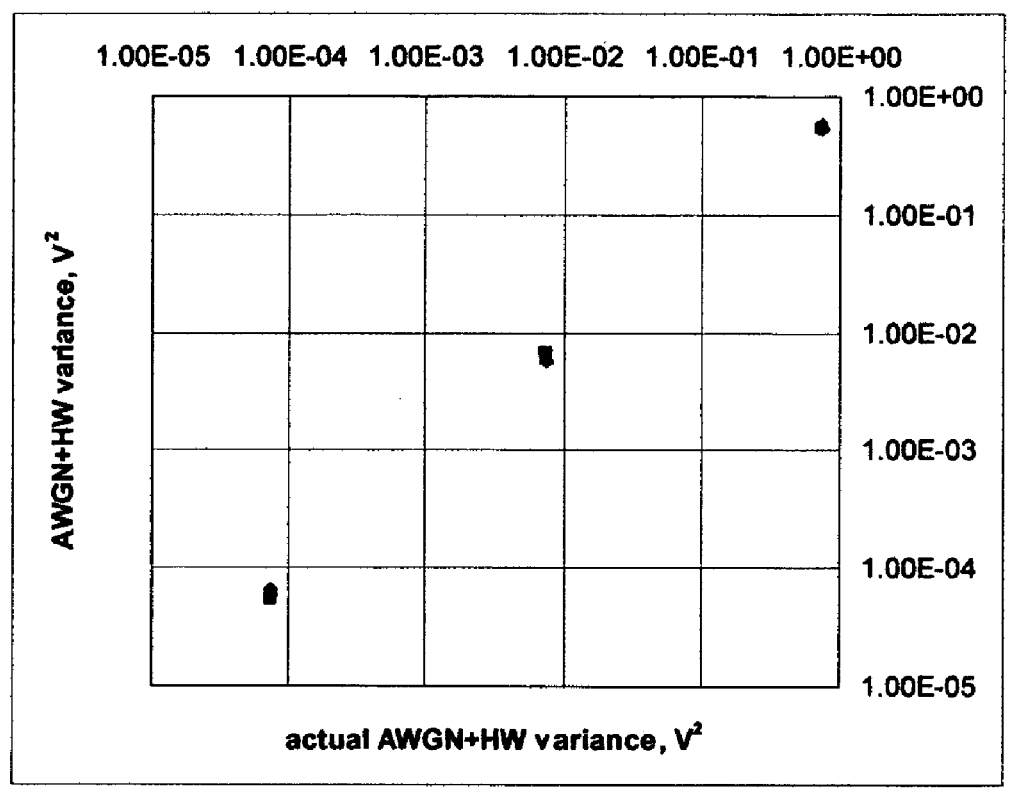
FIG. 10 is an estimated versus the actual level of interferers obtained by using FSN sets in the system shown in FIG. 4.

FIGS. 9 to 10 present simulation results of an FSN set test. Simulation parameters are: sampling rate 128 MHz; N=16,384; n=256; sampler aperture and aperture jitter are both equal to D/4; a multipath channel with one path, r=200e-9 seconds, and K-factor=1; b=0.01; and A=1 V. To obtain each data point the test was run three times as shown in the figures. FIG. 9 presents results in the case of the AWGN only; FIG. 10 corresponds to a channel distortion by two interferers, AWGN and a harmonic wave with the frequency of 12.8e+6 Hz. In the last case the amplitude of each periodical interferer was set to be equal to the m.s.d. of AWGN. The results show a good agreement between actual and estimated levels of interferers (e.g. the maximum deviation of an estimate from the actual value was never larger than 1 dB).

Determining the Noise Level in a Non-Baseband System

This section gives the most important proof of the concept presented in this invention. Specifically, we describe the results of simulating the SNR test including up/down-conversion of the baseband signal. FIG. 11 presents the system considered. Token 30 implements a waveform generator and an upconverter. In the case of a PSN set it generates the following waveform:

$$s(t)=A\ \sin(2\pi ht+\pi ft+(2\pi n/N)\lfloor ft/n \rfloor) \quad (4)$$

In Eq. (4) the same notations as in Eq. (1) are used; with one new parameter, h, representing the carrier frequency. In the case of an FSN set the waveform generated is:

$$s(t)=A\ \sin(2\pi ht+\pi ft(1-b+(2bn/N)\lfloor ft/n \rfloor)) \quad (5)$$

The waveform is then transmitted over a multipath channel (token 31), and it is also corrupted by an additive noise (token 38). At the receiver the waveform is down-converted by multiplying it by:

$$s(t)=\sin(2\pi ht+F) \quad (6)$$

(tokens 37 and 39); F is a phase shift between signals at the transmitting and receiving stations. Then the waveform is sampled (token 36), filtered (token 33), squared (token 34), and averaged (token 35) with a window whose parameters were discussed earlier. The results are collected over the test duration, and the minimum is determined which yields an estimate of the noise level (token 42).

The parameters used in simulations are as follows: the carrier is a harmonic wave with an amplitude of 1 V and frequency of 256e+6 Hz. The carrier is sampled at a rate of 1,024e+6 Hz. The baseband signal is sampled at a rate of 128e+6 Hz. Then the Butterworth lowpass filter with 10 poles and a cutoff frequency of 62e+6 Hz is applied. This means that the spectral window scanned is 194e+6 Hz to 318e+6 Hz. The actual level of noise in this window is determined by passing the noise through a bandpass filter (token 40). In this set of simulations the aperture and jitter of the sampler presented by token 6 on the receiver are 0.

Figure 12:
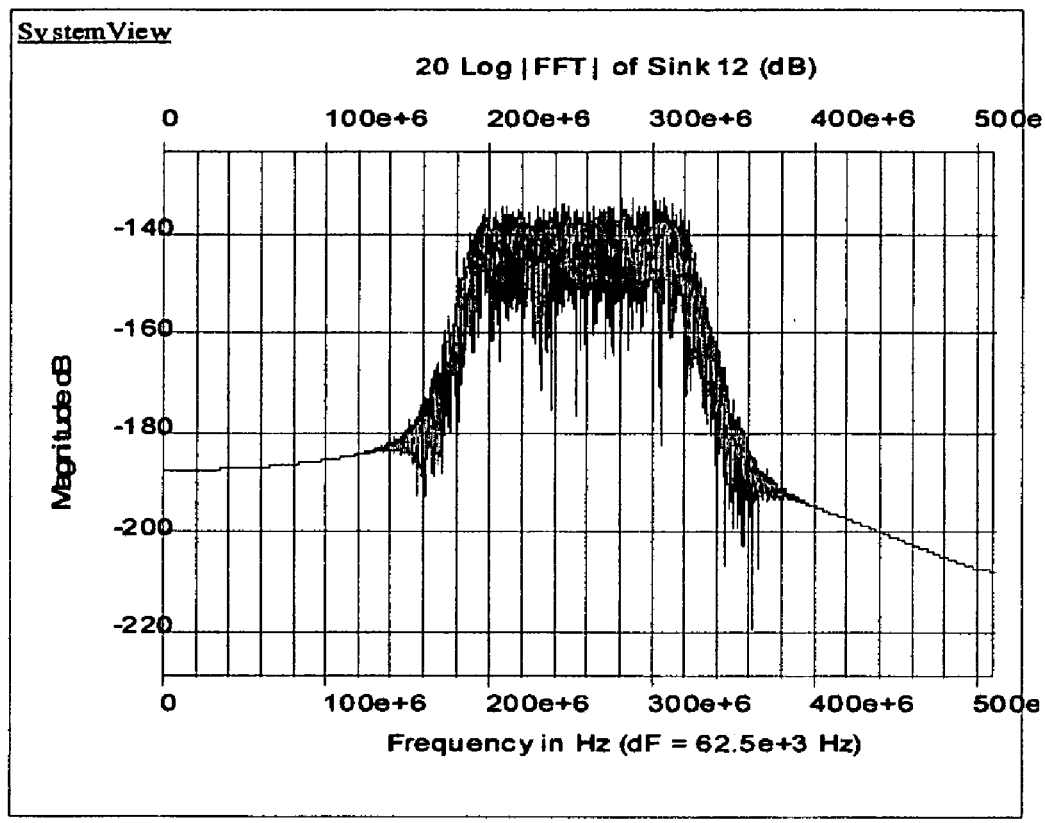
FIG. 12 is the noise spectrum in the spectral window scanned.

FIG. 12 shows the Fourier spectrum of the noise at the outlet of token 40. FIGS. 13 to 19 present the results of the SNR test with AWGN as the only interferer. Note that the variance of the transmitted signal is 0.5 sq. V.

Figure 13:
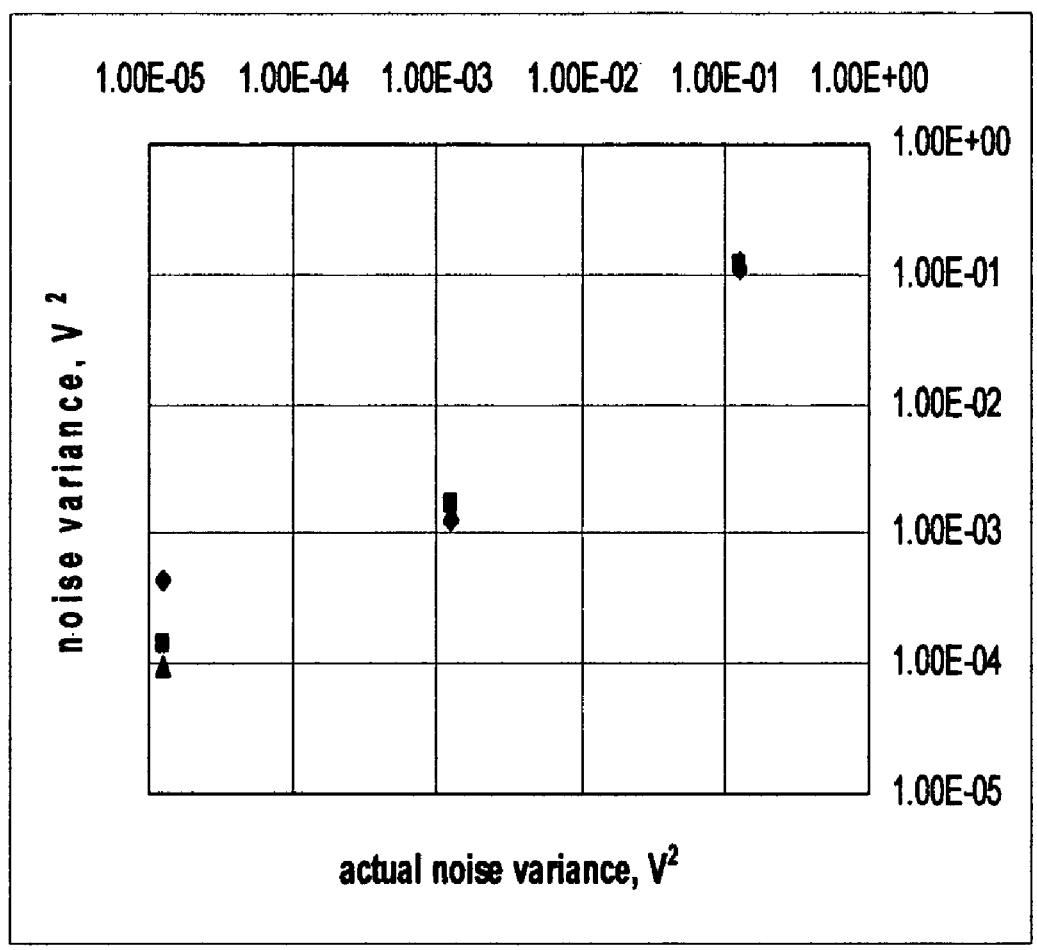
FIG. 13 is an estimated versus the actual level of interferers obtained by using PSN sets in the system shown in FIG. 11.
Figure 14:
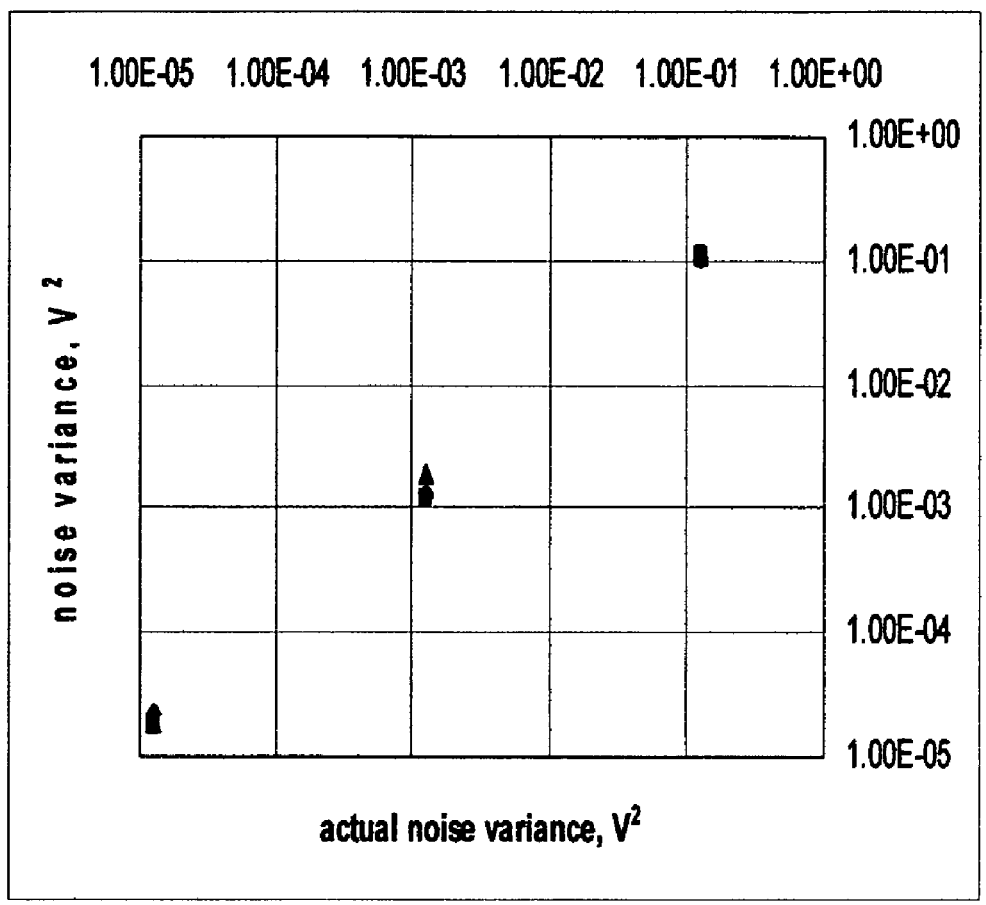
FIG. 14 is an estimated versus the actual level of interferers obtained by using PSN sets in the system shown in FIG. 11.
Figure 15:
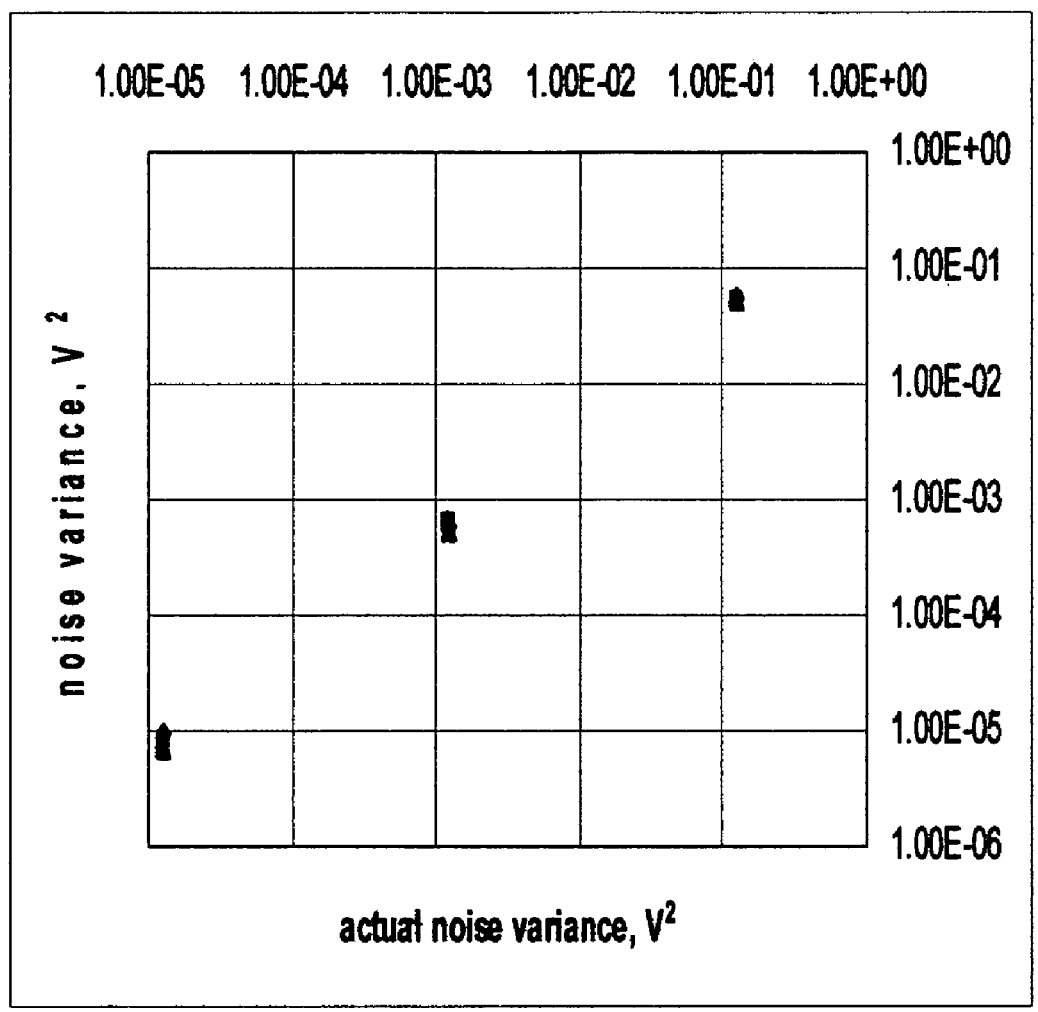
FIG. 15 is an estimated versus the actual level of interferers obtained by using PSN sets in the system shown in FIG. 11.

FIG. 13 presents the results of the SNR test using a PSN set; the total number of samples is 16,384 (i.e. the total number of "baseband samples" is 2048). In the low and intermediate SNR range the typical variation of results is negligible while in high SNR range the variation is considerable. FIG. 14 shows the results with the same parameters except for the total number of samples being 65,536 (or "baseband samples" 8192). Increasing the number of samples makes the variation in the results in high SNR range also negligible. FIG. 15 presents the results with the same set of parameters that were used in generating FIG. 13 except for the sampler parameters: namely, at the receiving station after down-conversion the PSN set is sampled with the aperture of 1.95e-9 seconds and the jitter constant of 0.97e-9 seconds. The results show a consistent underestimation of the noise variance by about 3 dB in the entire SNR range studied.

Figure 16:
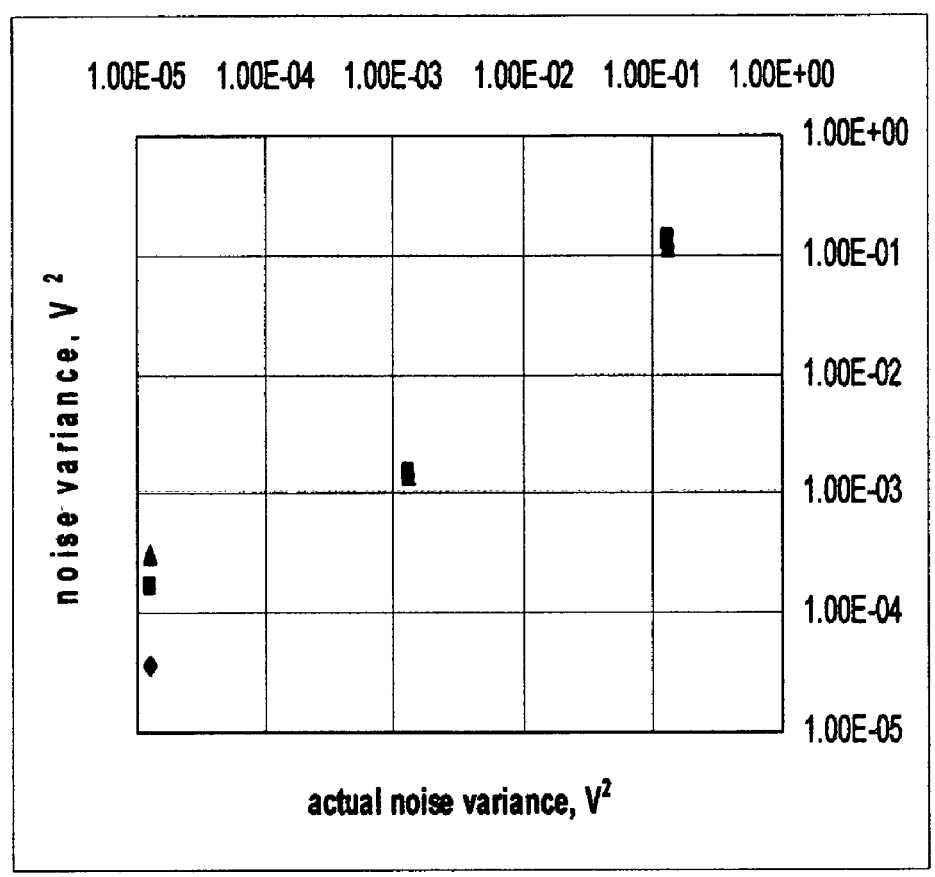
FIG. 16 is an estimated versus the actual level of interferers obtained by using FSN sets in the system shown in FIG. 11.
Figure 17:
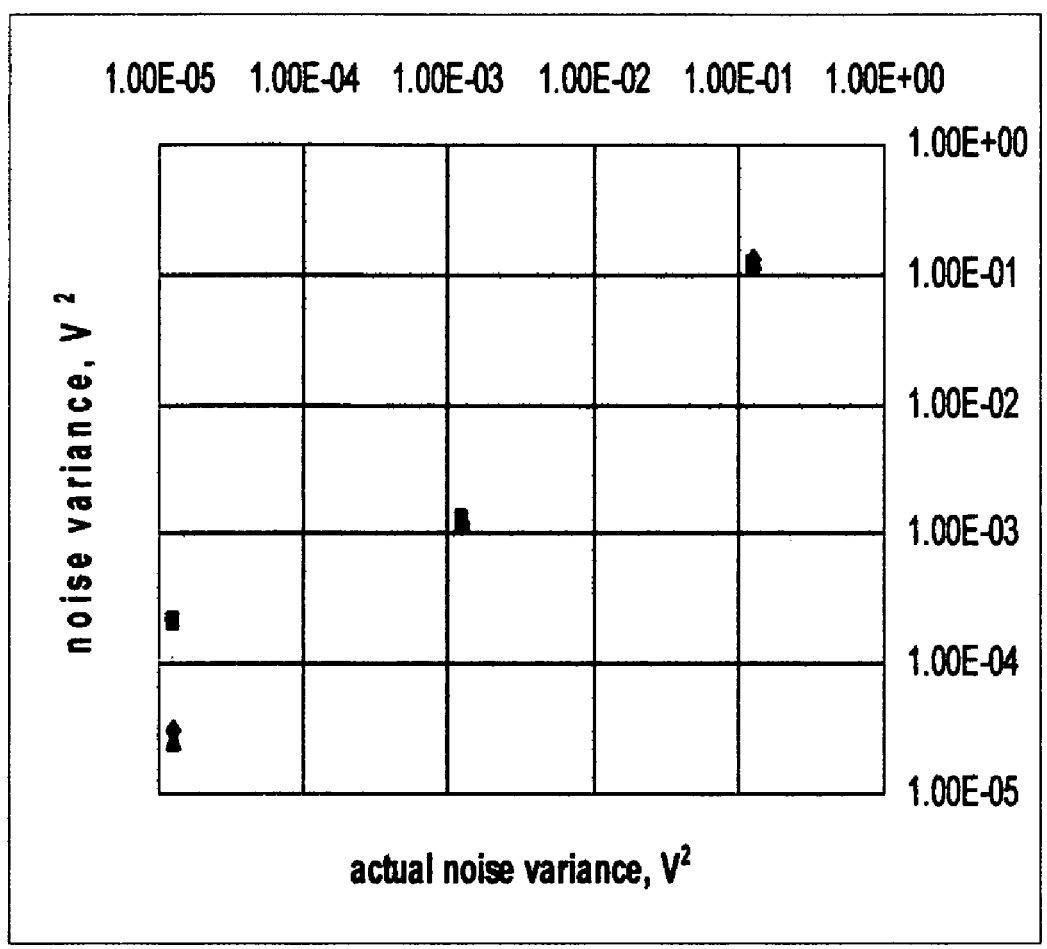
FIG. 17 is an estimated versus the actual level of interferers obtained by using FSN sets in the system shown in FIG. 11.
Figure 18:
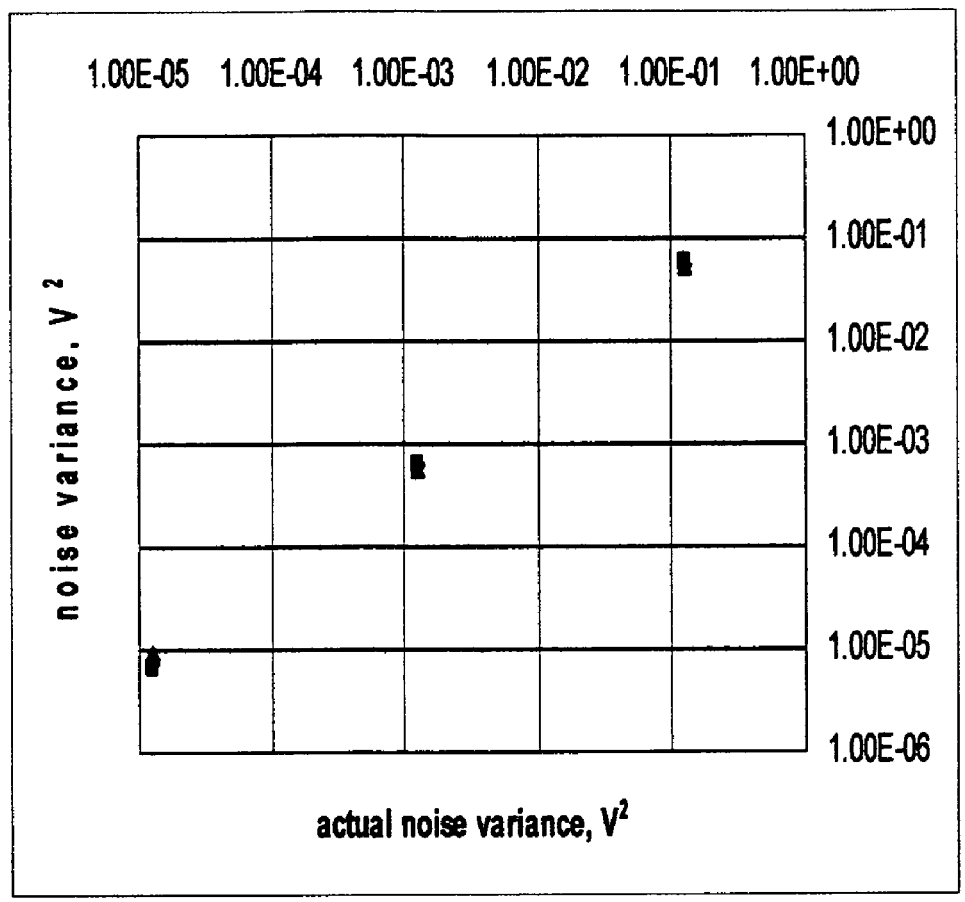
FIG. 18 is an estimated versus the actual level of interferers obtained by using FSN sets in the system shown in FIG. 11.

FIG. 16 presents the results of an SNR test using an FSN set with b=0.01, the total number of samples was 16,384; and the waveform was assumed to be sampled at the receiving station without jitter. FIG. 17 shows the results with the same parameters except that the total number of samples was 65,536. Again, an increase in the total number of samples in the waveform used for this test improves the precision of the estimated level of noise in the high SNR range. FIG. 18 presents the results with the same set of parameters that was used in generating FIG. 16 except for the sampler parameters: namely, at the receiving station after down-conversion the FSN set is sampled with the aperture of 1.95e−9 seconds and the jitter constant of 0.97e−9 seconds. The results show a consistent underestimation of the noise variance by about 3 dB in the entire SNR range studied.

Figure 19:
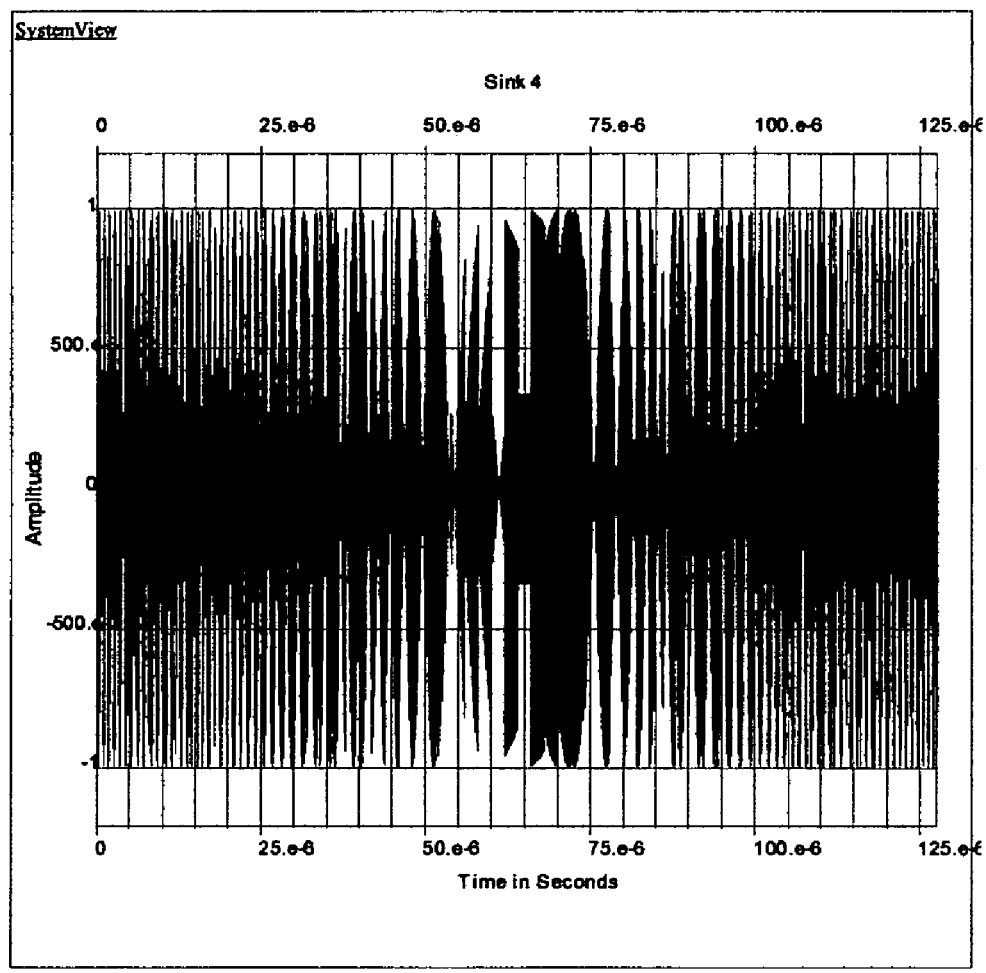
FIG. 19 is an example of a frequency spanning Nyquist (FSN) set.

FIG. 19 presents an example of an FSN set generated at the transmitting station.

Also, we have run simulations for the same set of parameters but varying the phase shift F. This is important in order to determine how large the variation in the results would be if the signal detection were performed non-coherently and F would not be controlled. In all cases the effect of choosing F at random did not exceed 0.5 dB.

Measuring the Level of a Useful Signal

Figure 20:
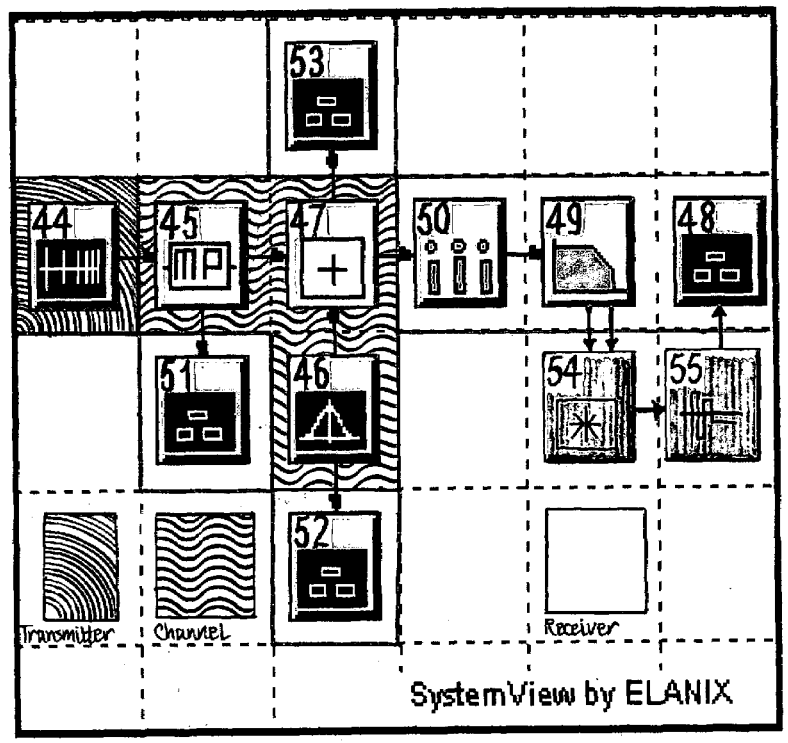
FIG. 20 is a baseband system for estimating the level of useful signal.

So far, we concentrated on determining the level of interferers in the channel. One also has to determine the level of a useful signal at the receiving station. This is accomplished by transmitting several repetitions of the useful signal. A corresponding baseband system is shown in FIG. 20. Token 44 represents a generator of a useful signal. The signal passes through the channel (tokens 45, 46, and 47). At the receiving station this signal is sampled (token 50) and filtered (token 49). Squaring (token 54) and averaging the result over the duration of the useful signal (token 55) yields a value of its level plus the level of noise (token 48). Finally, subtracting the level of interferers determined earlier from this value yields the level of the useful signal.

Figure 21:
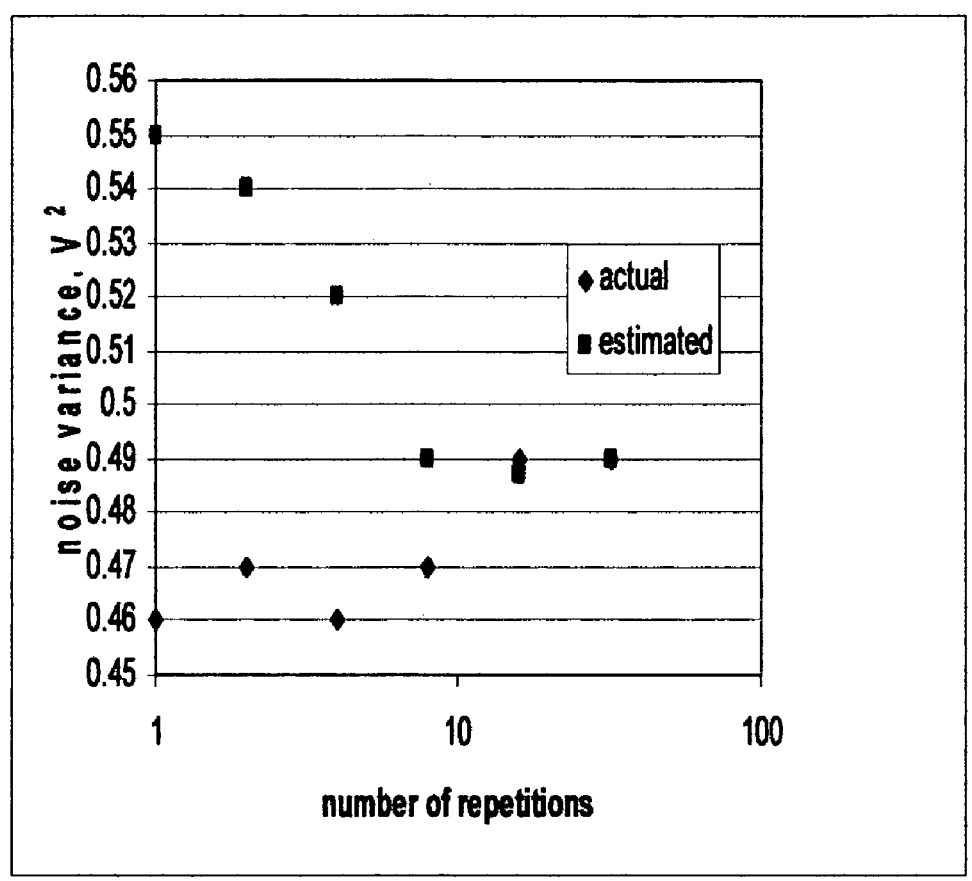
FIG. 21 is an estimated and the actual level of noise versus the number of repetitions.

FIG. 21 shows how many repetitions of a useful signal one has to transmit to be able to reliably determine its level. Initial data are: a sampling rate of 128 MHz; a channel with one path, a maximum delay of 200e−9 seconds, and K-factor of 1 (token 45); AWGN with m.s.d. of 0.71 V (token 46); and a sampling jitter of D/10. The signal used was a chirp with an amplitude of 1 V, a start frequency of 0 Hz, a stop frequency of 25 MHz, and a period of 1e−6 seconds (token 44). FIG. 21 shows the dependencies of the difference in measuring variances in tokens 53 and 51 (which should yield an actual noise variance) and the actual noise variance (token 52) versus the number of signal repetitions. These two dependencies converge as the number of repetitions is about 32.

CONCLUSIONS

This invention introduces a method for estimating the level of interferers and the level of a useful signal in a communications channel in a complex multipath propagation environment. The method uses a special waveform that can be either the PSN set (Eq. (1)) or the FSN set (Eq. (3)). The method comprises:

Determining the maximum delay in the channel by sending a pulse from the transmitting station to the receiving station;

Generating either a PSN set (Eq.(1)) or an FSN set (Eq. (3)) at the transmitting station;

Upconverting and transmitting it from the transmitting station;

At the receiving station, downconverting, sampling, and passing it through a filter;

At the receiving station, squaring it; or, in the case of a PSN set, applying the transformation given by Eq. (2);

At the receiving station, averaging the result with a window smaller than the parameter n in Eqs. (1) or (3) by the maximum delay in the channel determined earlier;

At the receiving station, determining the minimum of the result over the duration of the waveform; which determines the level of noise in the channel;

At the transmitting station, generating, upconverting, and transmitting several repetitions of the useful signal;

At the receiving station, downconverting, sampling, and filtering the signal;

At the receiving station, squaring and averaging the result over the duration of the useful signal which yields its level plus the level of noise;

At the receiving station, determining the level of the useful signal by applying the level of noise value and calculating the channel SNR.

As we present a method of determining the channel quality between two stations, our method also describes a procedure for determining the quality of data transmission in a network if these two stations are nodes of the network.

The essence of this method of estimating the level of interferers in a spectral window of a given bandwidth is generating and transmitting several sets of sine waves on or around the Nyquist frequency for this window. This is what makes this method work even for very complex propagation environments and determines its performance characteristics.

Figure 22:
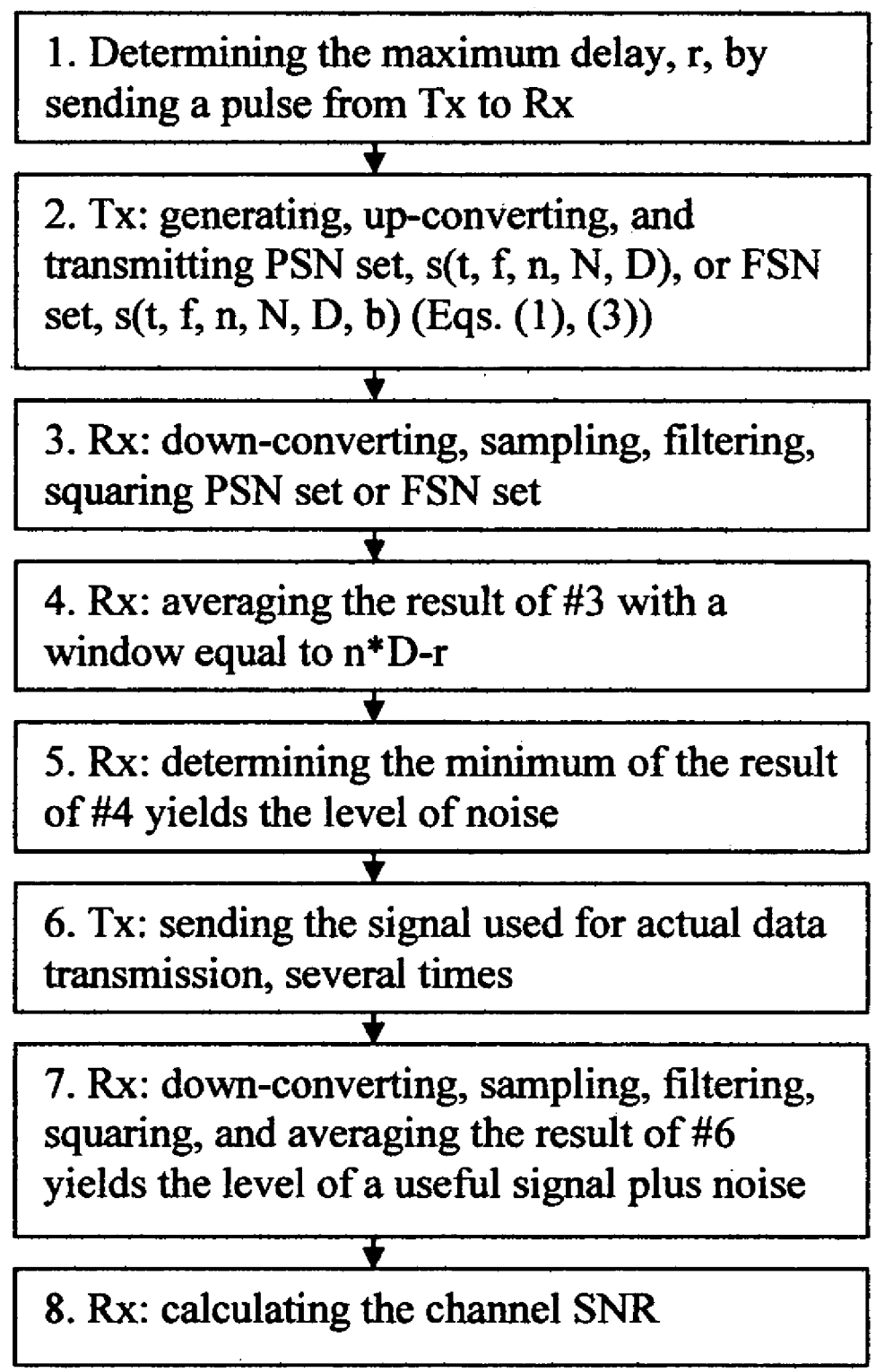
FIG. 22 is a flowchart of the method described.

FIG. 22 presents a flowchart of the method.

REFERENCES

John G. Proakis: Digital Communications, McGraw Hill, New York, 1995;

John G Proakis, Masoud Salehi: Contemporary Communication Systems Using Matlab, Brooks/Cole, Pacific Grove, 2000;

Dimitri Bertsekas, Robert Gallager: Data Networks, Prentice Hall, New Jersey, 1992;

"Energy estimator and method therefore", U.S. Pat. No. 5,666,429;

"Low complexity model based channel estimation algorithm for fading channels", U.S. Pat. No. 5,581,580;

"Average signal to noise ratio estimator", U.S. Pat. No. 6,442,495;

"Method and apparatus for operating an adaptive decision feedback equalizer", U.S. Pat. No. 6,298,242;

"System and method for bit loading with optimal margin assignment", U.S. Pat. No. 6,205,410;

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for determining the level of interferers and the level of a useful signal in a spectral window of a communications channel between a transmitting station and a receiving station comprising:

generating a predefined baseband waveform with a frequency approximately equal to the Nyquist frequency of the spectral window at the transmitting station;
upconverting and transmitting the waveform at the transmitting station;
receiving, downconverting, and interpreting the waveform at the receiving station to determine the level of interferers;
generating the useful signal at the transmitting station;
upconverting and transmitting several repetitions of the useful signal;
receiving, downconverting, and interpreting the useful signal at the receiving station to determine the level of the useful signal;
wherein said waveform comprises at least one harmonic signal;
wherein said harmonic signal comprises a predefined number of repetitions of a sine wave with predefined magnitude and frequency;
wherein said frequency of the harmonic signal is approximately equal to the Nyquist frequency of the spectral window;
wherein the magnitude of the harmonic signal is approximately equal to the magnitude of the useful signal;
wherein the communications channel is characterized by a maximum delay;
wherein said maximum delay is measured;
wherein measuring said maximum delay comprises sending a pulse from the transmitting station to the receiving station;
wherein establishing the duration of time intervals between successive harmonic signals in the waveform, wherein the duration is set not smaller than the maximum delay;
wherein interpreting the waveform at the receiving station comprises:
  sampling and filtering the waveform;
  squaring the waveform and averaging the result of the squaring with a time window of a predefined size;
  determining the minimum of the result of the averaging over the total duration of the waveform;
  and equating the level of interferers to the value of the minimum;
wherein the waveform comprises a sequence of harmonic signals with a frequency approximately equal to the Nyquist frequency of the spectral window and phase values evenly distributed in the interval (0, 2π) radians;
wherein said waveform is determined in accordance with the following relationships:

$s(t)=A*\sin(\pi*f*t+(2*\pi*n/N)*int(f*t/n))$, where f represents the sampling rate;
N represents the total number of samples in the waveform;
n represents the number of samples in the time window used in the averaging plus the number of samples in a time interval equal to the maximum delay;
A represents the amplitude of the waveform;
int(x) is the maximum integer function to generate the maximum integer not exceeding a given real number x;
and t represents the time.

2. A method for determining the level of interferers and the level of a useful signal in a spectral window of a communications channel between a transmitting station and a receiving station comprising:

generating a predefined baseband waveform with a frequency approximately equal to the Nyquist frequency of the spectral window at the transmitting station;
upconverting and transmitting the waveform at the transmitting station;
receiving, downconverting, and interpreting the waveform at the receiving station to determine the level of interferers;
generating the useful signal at the transmitting station;
upconverting and transmitting several repetitions of the useful signal;
receiving, downconverting, and interpreting the useful signal at the receiving station to determine the level of the useful signal;
wherein said waveform comprises at least one harmonic signal;
wherein said harmonic signal comprises a predefined number of repetitions of a sine wave with predefined magnitude and frequency;
wherein said frequency of the harmonic signal is approximately equal to the Nyquist frequency of the spectral window;
wherein the magnitude of the harmonic signal is approximately equal to the magnitude of the useful signal;
wherein the communications channel is characterized by a maximum delay;
wherein said maximum delay is measured;
wherein measuring said maximum delay comprises sending a pulse from the transmitting station to the receiving station;
wherein establishing the duration of time intervals between successive harmonic signals in the waveform, wherein the duration is set not smaller than the maximum delay;
wherein interpreting the waveform at the receiving station comprises:
  sampling and filtering the waveform;
  squaring the waveform and averaging the result of the squaring with a time window of a predefined size;
  determining the minimum of the result of the averaging over the total duration of the waveform;
  and equating the level of interferers to the value of the minimum;
wherein said waveform is determined in accordance with the following relationships:

$s(t)=A*\sin(\pi*f*t+(2*\pi*n/N)*int(f*t/n))$, where f represents the sampling rate;
N represents the total number of samples in the waveform;
n represents the number of samples in the time window used in the averaging plus the number of samples in a time interval equal to the maximum delay;
A represents the amplitude of the waveform;
int(x) is the maximum integer function to generate the maximum integer not exceeding a given real number x;
and t represents the time;
wherein the waveform comprises a sequence of harmonic signals with the same phase and with frequencies evenly distributed in a vicinity of the Nyquist frequency of the spectral window.

3. The method of claim 1 wherein interpreting the useful signal comprises: sampling and filtering the useful signal; determining the sum of the level of the useful signal and the level of interferers by squaring and averaging the result of the filtering over the total duration of the useful signal; and determining the level of the useful signal by subtracting the level of interferers from the sum.

4. The method of claim 1 comprising determining the signal-to-noise ratio of the communications channel by computing the ratio of the level of the useful signal and the level of interferers.

5. The method of claim 1 wherein the transmitting station and the receiving station are nodes of a network.

* * * * *